COMPRESSION CONTACTED SEMICONDUCTOR DEVICES

Filed March 15, 1963

INVENTOR.
JOSEPH MARINO
BY
C. L. Menzemer
ATTORNEY.

United States Patent Office 3,170,098
Patented Feb. 16, 1965

3,170,098
COMPRESSION CONTACTED SEMICONDUCTOR DEVICES

Joseph Marino, North Huntingdon Township, Westmoreland County, Pa., assignor to Westinghouse Electric Corporation, Pittsburgh, Pa., a corporation of Pennsylvania Filed Mar. 15, 1963, Ser. No. 265,424
2 Claims. (Cl. 317—234)

The present invention relates to electrical devices that are of a sealed nature and in particular concerns such structures in which pressure is used to facilitate contact of internal parts.

One of the problems in the semiconductor industry is the provision of mounted semiconductor elements that are hermetically sealed and are characterized, internally, by good electrical and thermal contact. The tendency in this particular art is such that encapsulation procedures and structures to achieve this result are becoming considerably complex. High cost of such structures is in part due to labor costs in producing them; and it is therefore evident that the greater the complexity, the higher will be the cost of providing such electrical devices.

It is therefore the primary object of the present invention to provide a sealed electrical device comprising a semiconductor element, at least two electrodes, mounting means and a header element enclosing the foregoing in which the number of parts needed is reduced, good electrical contact is achieved, and reliable and constant pressure is applied on the contacting elements.

A further object of the invention is to provide a hermetically sealed semiconductor device wherein electrodes and semiconductor elements are urged into good electrical and thermal contact with one another by an intermediate header having structure that eliminates the need for structure heretofore used.

Other objects will be apparent from the following detailed description and drawings.

These and other objects are attained in accordance with the present invention in a sealed electrical device, that includes a semiconductor element having electrode contacts on its opposed major surfaces and which is disposed on a support in which good electrical and thermal contact is provided, by an intermediate header surrounding the semiconductor element and its electrode contacts and which at one end is fixedly attached to the support while its other end resiliently urges the aforementioned elements into pressurized contact with one another. The present invention provides sealed electrical devices in a simple fashion, and in a manner by which parts heretofore thought essential have been eliminated.

Figure 1:
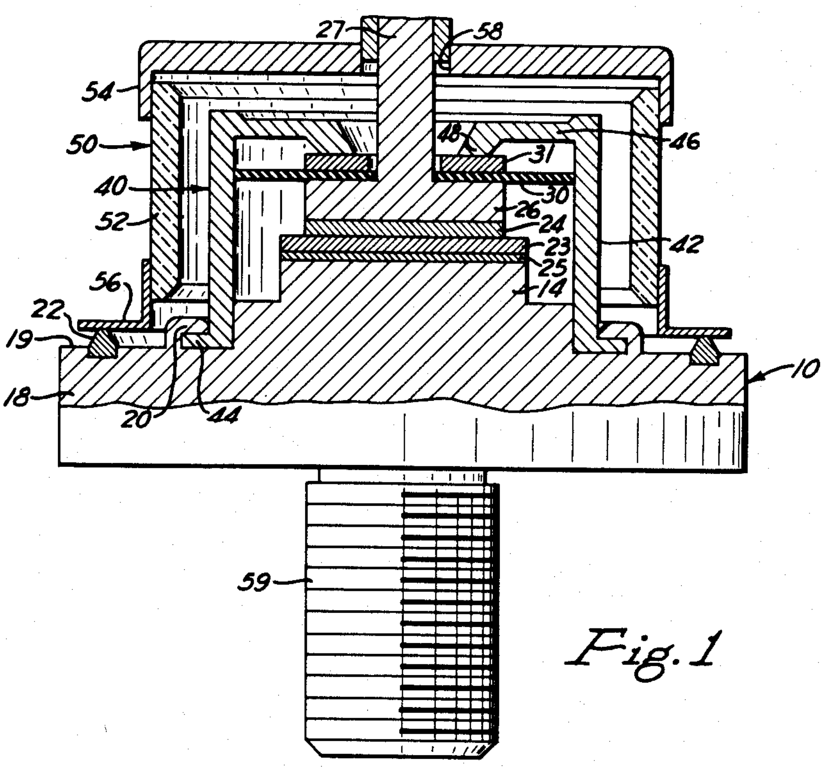
Figure 2:
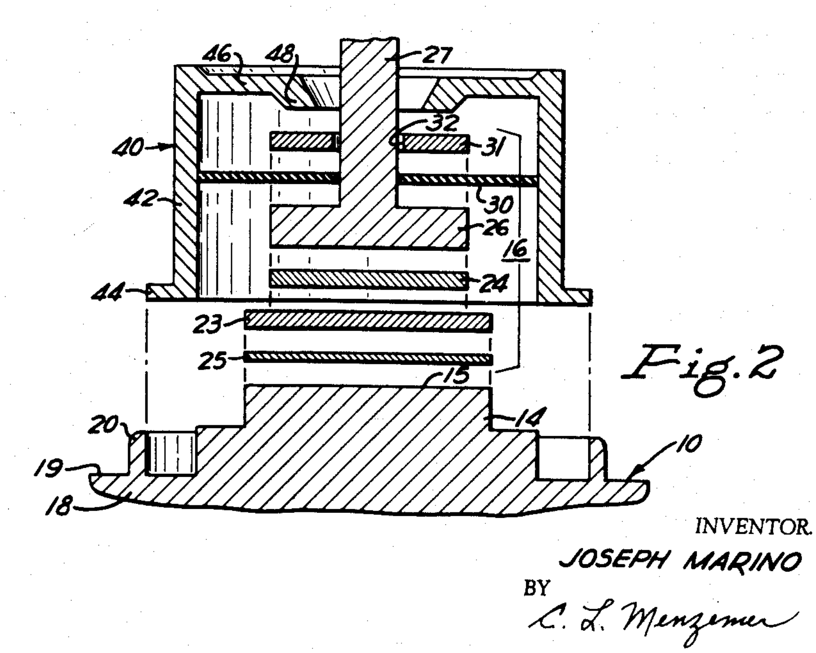

The invention will be described in detail in conjunction with the attached drawing in which:

FIG. 1 is a vertical section of a sealed electrical device embodying the present invention; and FIG. 2 is an enlarged exploded sectional view of the central portion of the device of FIG. 1 showing the parts thereof in greater detail and clarity.

Referring now to the drawings, a sealed electrical device according to the invention includes a support member 10 that functions to dissipate heat and as an electrical contact. It may be composed of a metal selected from the group consisting of copper, copper base alloys, silver, silver base alloys, aluminum and aluminum base alloys, and ferrous base alloys. Copper and brass have been found particularly satisfactory for this purpose. The support member 10 includes a centrally disposed upwardly extending mounting portion 14 having an upper flat surface 15. A contact assembly 16, as described in detail hereinafter, is supported or rests on the surface 15 of the mounting member 14. Surrounding the mounting portion 14 is a laterally extending peripheral flange 18 having a generally flat upper surface 19. An upwardly extending peripheral flange 20 is provided that is integral with the upper surface 19 of the laterally extending peripheral flange 18. Laterally of the upwardly extending flange 20 is a metal ring 22 joined to the surface 19 of the laterally extending flange 18.

As shown in greater detail in the exploded view in FIG. 2, an anode contact 23, suitably comprising a metal such as molybdenum or tungsten or base alloys thereof, is located on the upper surface 15 of the mounting support member 14. If desired, the anode contact 23 can be separated from the mounting portion 14 by a non-reactive, malleable, electrically and thermally conductive metal layer 25. Such a member can be made of gold or silver and can serve primarily to compensate for surface irregularities of surface 15 or anode contact 23. On the upper surface of the anode contact 23 is a semiconductor element 24. Preferably, the semiconductor element 24 and the anode contact 23 have similar thermal expansion characteristics.

The semiconductor element 24 may be, and preferably is, joined to the anode contact 23 in a prior joining operation as by soldering or the like.

Above the semiconductor element is a cathode contact 26 made of copper or other good conducting material. Suitably this is a disc-shaped member of a size similar to semiconductor element 24, and it has a central cylindrical extension 27 that serves as an electrical lead. The specific device shown is a simple diode and, accordingly, but one electrical lead is needed from the upper surface. However, in the use of the present invention for the purpose of providing a sealed electrical device functioning as a controlled rectifier or the like, a plurality of leads can be taken from the top of the semiconductor element 24. One way by which this can be accomplished is to construct a second lead within the cylindrical extension 27 and terminating at the surface of cathode contact 26 adjacent semiconductor element 24. The second lead would, of course, be insulated from the cathode contact as well as its cylindrical extension. It could be extended out of the side of the cylindrical extension 27, and through the casing member to be described hereinafter, through an insulating seal member.

Above the cathode contact 26 and surrounding its cylindrical extension 27 is an insulating washer 30 suitably made of mica or other insulating material. On the upper surface of washer 30 is a metal washer 31 having a central aperture 32 sufficient so that it does not come into contact with the cylindrical extension 27. Metal washer 31, the insulating washer 30, cathode contact 26, semiconductor element 24, anode contact 23 and the malleable metal member 25 in the aggregate are considered as the contact assembly 16.

In the use of this device, it is essential that the anode and cathode contact members 23 and 26, respectively, be in good thermal and electrical contact with the semiconductor element 24 and that these units have good electrical contact with their electrical leads, that is cylindrical extension 27 as the cathode lead and base mounting portion 14 as the anode lead. Accordingly, these members are brought together in pressure tight relationship at a pressure, for example, of 1000 to 2000 lbs. A pressure on the order of 1500 lbs. is satisfactory though this pressure can vary widely.

In accordance with the present invention, this pressure is applied and maintained by the use of an intermediate header member generally indicated by the numeral 40. It includes a cylindrical section 42 sized to surround the entire contact assembly 16. At its lower end, the cylindrical portion 42 has a peripherally extending flange 44 by which it is attached to the support member 10 on the upper surface 19 of the laterally extending peripheral flange 18 (see FIG. 1). The upper end of the cylindrical portion 42 has a centrally apertured cap 46 that is integral therewith. The entire intermediate header member 40 suitably is composed of hardened spring steel, but it is essential that the cap 46 be such. The inner periphery 48 at the aperture of the cap member 46 is shaped and of a length to bear on the upper surface of the metal washer member 31. The cap member 46 is pre-adjusted to exert a downward pressure on the washer of the level desired, when the entire assembly 40 is fixedly joined to the support member 10 at the flange as hereinbefore indicated. With this adjustment, the member is forced into engagement with the washer 31 and at that time its peripheral flange 44 engages surface 19 on the laterally extending peripheral flange of the support member 10. In that position, the upwardly extending peripheral flange 20 can be rolled down over the peripheral flange 44 of header 40 to hold it in place at the predetermined pressure. It will be observed that the invention thereby provides a very simple procedure in which there results a device having good electrical and thermal conducting properties, with all elements of the contact assembly in good contact with one another and maintained in that relationship under the desired pressure in a fashion that resists displacement by the application of external forces. Moreover, this result is achieved with the simplest of structures in a fashion that is amenable to production techniques.

The structure is completed and sealed by the use of a header member 50 that includes a sleeve 52 (refer to FIG. 1) suitably composed of a ceramic or other relatively hard insulating material. At its upper end, the sleeve is provided with a cap member 54 joined to its outer upper end. About its lower end and integral therewith is a laterally extending flange 56, suitably of a ferrous base metal, which is welded or otherwise sealingly joined to the circular ring 22 on the upper surface 19 of the peripheral flange 18 of the support member 10. The electrical conductor from the cathode contact 26, namely the cylindrical extension 27, suitably passes through a centrally located aperture 58 in the cap member 54 of the header assembly 50.

The entire unit as described suitably is attached rigidly to a stud 59 that is a good electrical conductor and thermal dissipating member. As shown in FIG. 1, the stud 59 is threaded to provide a convenient means for attachment thereof. It will be apparent that other means may be used as desired.

The primary function of the header assembly 50 is to hermetically enclose the structure and, accordingly, any particular construction desired can be used for this purpose. Another type header that can be adapted is shown in United States Patent No. 3,005,867. Others will be apparent to those skilled in the art.

From the foregoing discussion and description, it is apparent that this invention constitutes a unique simplification by which sealed electrical devices are provided. Good electrical and thermal contact are obtained while simplifying the structure and without sacrifice of physical ruggedness. It may be noted that the use for this particular invention is contemplated in conjunction with devices in the 2 to 20 amp. range.

Having illustrated and described a detailed embodiment of the invention, it should be understood that details can be varied without departing from its scope and that the description and drawings are to be construed as illustrative and not limiting on the invention.

What is claimed is:

1. A sealed electrical device comprising a good thermally conductive support, a laterally extending peripheral flange from the support having an upper surface, an upwardly extending base mounting portion having an upper surface integral with said support, an upwardly extending peripheral flange integral with the upper surface of said first-mentioned peripheral flange, a semiconductor element disposed on the upper surface of the base mounting portion, at least one electrical contact disposed on the upper surface of the semiconductor element, a cylindrical metal member surrounding the semiconductor element and having its upper end partially closed by a centrally-apertured cap which is resilient, a peripherally extending flange about the lower end of the cylindrical metal member, the upwardly extending flange on the peripheral flange of the thermally conductive support cooperating with the peripheral flange at the bottom of the cylindrical member to hold said cap member in pressure engagement with said electrical contact on the semiconductor element, and a header member containing an insulating segment joined to the outer periphery of the upper surface of the flange of the thermally conductive support to provide a hermetic enclosure for the semiconductor element.

2. A sealed electrical device comprising a good thermally conductive support having a laterally extending peripheral flange having an upward surface and an upwardly extending base mounting portion having an upper surface, an upwardly extending peripheral flange on the upper surface of the laterally extending peripheral flange, a contact assembly comprising a semiconductor element and at least one cathode and anode contact disposed on the upper surface of the base mounting portion, at least one electrical conductor joined to the cathode contact, a ferrous base metal cylindrical member having an integrally connected apertured resilient cap at the upper end thereof, a laterally extending peripheral flange about the bottom portion of the metal cylindrical member that, upon the apertured cap bearing on the upper electrode of the contact assembly, cooperates with the upwardly extending peripheral flange on the laterally extending peripheral flange of the base mounting support to maintain the apertured cap in pressurized relationship with the contact assembly, and a header member containing an insulating segment and having a laterally extending ferrous base metal flange welded to the outer periphery of the upper surface of the laterally extending flange of the support to provide a hermetic enclosure for the contact assembly.

References Cited in the file of this patent

UNITED STATES PATENTS

| | | |
|---|---|---|
| 2,861,226 | Lootens | Nov. 18, 1958 |
| 2,881,370 | Colson | Apr. 7, 1959 |
| 3,005,867 | Green et al. | Oct. 24, 1961 |
| 3,059,157 | English et al. | Oct. 16, 1962 |